Jan. 31, 1967    R. A. RISCHARD ETAL    3,301,940
FLEXIBLE CABLE BUS DUCT INCLUDING GROUNDING MEANS
AND TELESCOPICALLY ENGAGING TUBULAR MEMBERS
PERMITTING EXPANSION AND CONTRACTION
Filed April 1, 1964    2 Sheets-Sheet 1
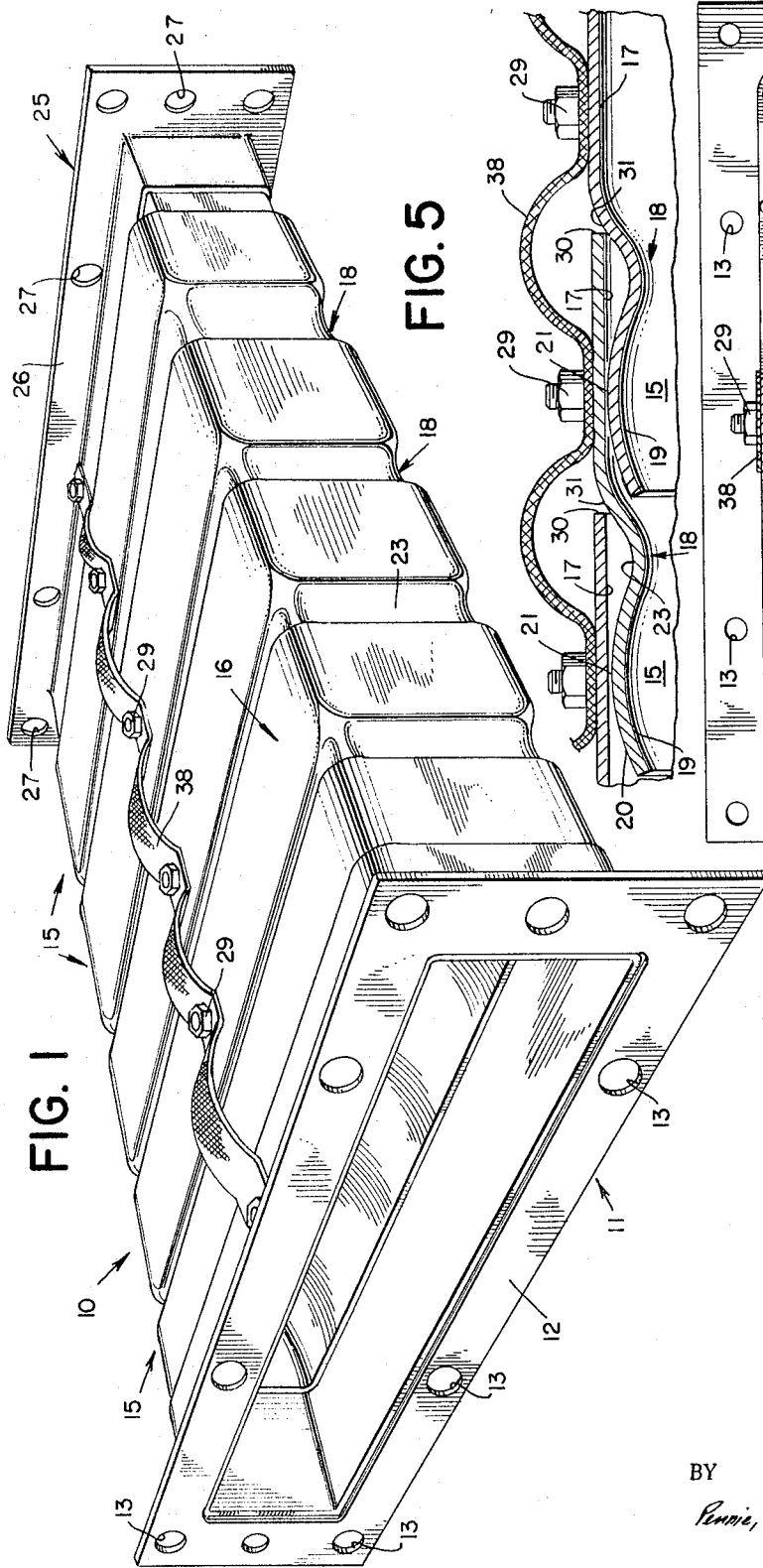
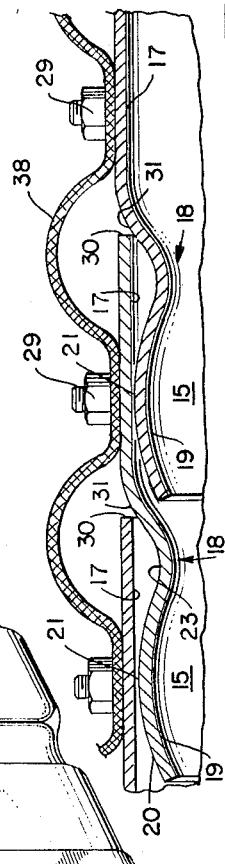
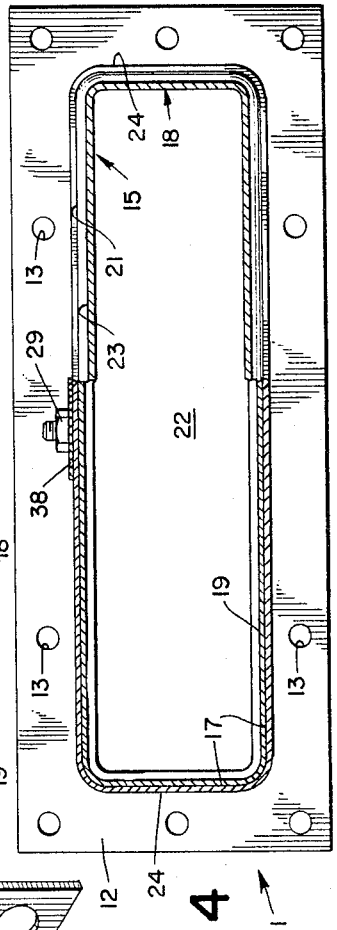
INVENTORS
ROBERT A. RISCHARD
JOHN E. JESSUP
BY
*Pennie, Edmonds, Morton Taylor & Adams*
ATTORNEYS

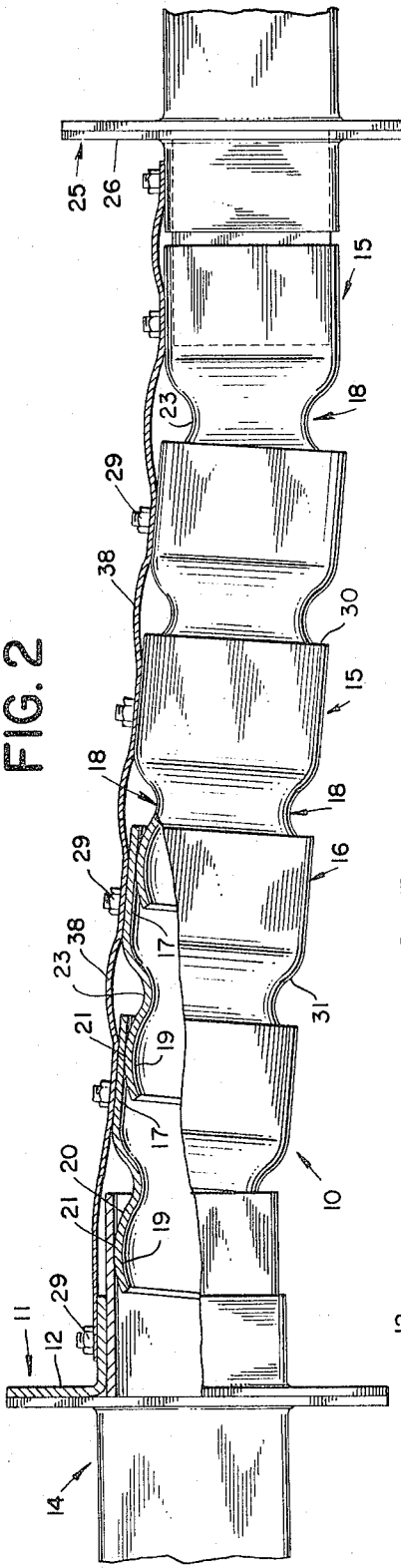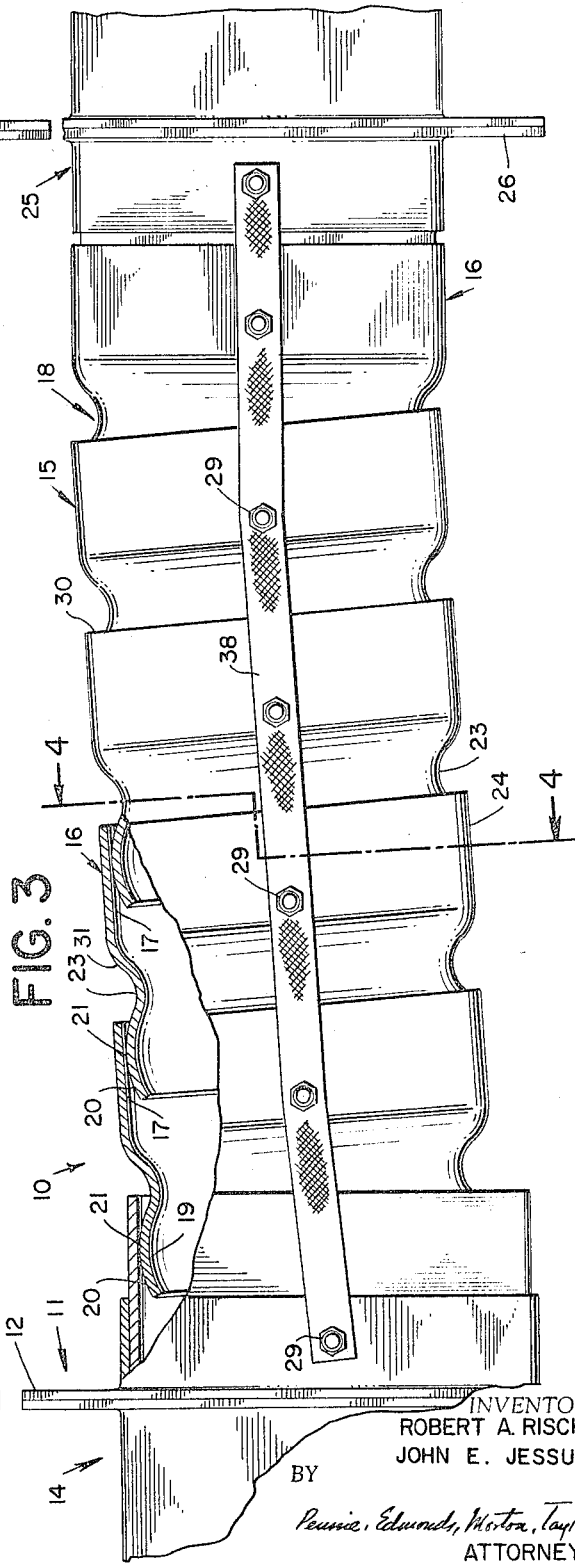

United States Patent Office 3,301,940
Patented Jan. 31, 1967

3,301,940
FLEXIBLE CABLE BUS DUCT INCLUDING GROUNDING MEANS AND TELESCOPICALLY ENGAGING TUBULAR MEMBERS PERMITTING EXPANSION AND CONTRACTION
Robert A. Rischard, Yonkers, N.Y., and John E. Jessup, Hamden, Conn., assignors to Anaconda Wire and Cable Company, New York, N.Y., a corporation of Delaware
Filed Apr. 1, 1964, Ser. No. 356,616
5 Claims. (Cl. 174—78)

This invention relates to a bus duct for electrical cables and, more particularly, it relates to a flexible bus duct unit that can be adjusted in several directions which is especially suitable for joining rigid bus duct structures to compensate for their misalignment, vibration, expansions, or contractions. For example, it can be used advantageously at a point where the bus duct structure changes from generator foundation mounting to building mounting to dampen and absorb vibrations and other movements. It also can serve as an expansion joint in a bus duct system to permit expansion and contraction due to temperature variations, or used to adjust the misalignment of equipment or mistakes made in building construction.

Broadly stated, a flexible bus duct unit of this invention comprises a first end section that has a tubular body and connecting means at its end for joining the bus duct to other units. An intermediate section is connected to the first end portion which has a plurality of telescopically connected tubular members each of which has a tail portion with a substantially uniform cross section. The tubular member also has a tapered neck portion adjacent to the tail portion and a bulging front portion adjacent to the neck portion adapted to insert into the tail portion of a similar tubular unit. This front portion has a curved outer surface along the longitudinal axis of the tubular member which provides a maximum outer cross-sectional area substantially equal to the inner cross-sectional area of the tail portion of a similar unit. The unit has a second end portion connected to the intermediate section, which also has a tubular body and connecting means for connecting the bus unit to other units. An electrical conductive limiting means is provided at the outer surface of the bus unit so as to limit the expansion of the unit and simultaneously grounding each member of the bus duct unit.

The flexible bus duct unit of this invention is preferably in rectangular shape to conform with the conventional bus duct structure. The unique structure of the present bus duct unit makes it advantageous to incorporate at least one of this unit into a bus duct system for electrical cables and bus bars to compensate for vibration, expansion, contraction and misalignment experienced by the system. Further, to illustrate applicants' invention, a specific embodiment is described hereinbelow with reference to the accompanying drawings wherein FIG. 1 is a perspective view of the bus duct unit;

FIG. 2 is a side elevation of the same unit partly in section and partly broken away;

FIG. 3 is a top elevation of the same unit partly in section, and partly broken away;

FIG. 4 is a section taken along line 4—4 of FIG. 3; and

FIG. 5 is an enlarged fragmentary section showing the relationship between the telescopically connected tubular members.

Referring initially to FIGS. 1, 2 and 3, the bus duct unit 10 has an end section 11 with a rectangular tubular body and a flange portion 12 attached to its end for joining the bus duct unit 10 to another unit 14 with connecting means (not shown) through holes 13. The end section 11 is connected to an intermediate section comprising a plurality of telescopically connected tubular members 15 to form a flexible section. Each of these members has a tail portion 16 which has a substantially rectangular uniform cross section with flat internal surfaces 17. The midsection of the tubular member 15 has a reduced cross section forming a tapered neck portion 18. Adjacent to the neck portion is a bulging front portion 19 with four smooth curved outer surfaces 20 along its longitudinal axis, which has their peaks 21 at about the middle section of the front portion 19. The bulging front portion 19 has a substantially rectangular cross section 22 as shown in FIG. 4. This cross section 22 perpendicular to the longitudinal axis of the tubular member 15, increases progressively from the smallest cross-sectional area at the neck portion 18, which has an outer peripheral wall 23, to a maximum outer cross-sectional area at the peaks 21 of the curved outer surfaces with peripheral walls 24 engaging the flat surfaces 17 of a tail portion 16 of a preceding tubular member. After reaching the maximum size at the peaks 21 of the curve surfaces, the cross-sectional area decreases to about the size of the neck portion 18 at the mouth 22 of the front portion.

The combined smooth curved outer surface 21 and the rectangular cross section 22 of the bulging front portion 19 enable the telescopically connected tubular members 15 to pivot with respect to each other and simultaneously providing a tight fit between each member. The degree of rotation of each tubular member depends on the curvature of the outer surface 20 and the relative length of the tail portion with respect to the front portion. The bending of the bus duct unit 10 is shown in FIGS. 2 and 3.

The last tubular member of the intermediate section is connected to a second end section 25 having a rectangular body and a flange portion 26 connected to its end. The flange 26 has holes 27 for connecting the bus duct unit to another duct.

In addition to the rotatable movement described, the telescopic connection of the present bus duct unit further allows each of its members to slide longitudinally. The maximum expansion of the unit, however, is limited by a braided cable 38 connected at its outer surface connecting to the end sections and each tubular member by fasteners 29. By using a braided cable as a limiting means for the expansion of the unit, it further serves as a continuous ground for each member. At the fully contracted stage, the end 30 of the tail portion 16 contacts the shoulder portion 31 of the subsequent unit as shown in FIG. 5.

The bus duct unit of the present invention can be constructed of any suitable material preferably a metal having sufficient rigidity to withstand the normal abrasive action experienced by the bus duct. We find that aluminum about 0.06 inch thick will serve adequately. The amount of adjustability of the unit depends on the size and the number of individual members in the intermediate sections. It is preferred there be at least a minimum of 2 inches adjustment in all directions. Greater adjustment can be made by adding additional tubular members in the intermediate section.

We claim:
1. A flexible bus duct unit comprising:
   (a) a first end section having a tubular body and connecting means at one end thereof for joining said bus duct to other units;
   (b) an intermediate section connected to said first end portion comprising a plurality of telescopically connected tubular members each of which has a tail portion with a substantially uniform cross section, a tapered neck portion adjacent to said tail portion, and a bulging front portion adjacent to said neck portion adapted to insert into the tail section of a similar tubular member, said front portion having a curved outer surface along the longitudinal axis of said tubular member providing a maximum outer cross-sectional area substantially equal to the inner cross-sectional area of said tail portion of a similar unit;
(c) a second end section connected to said intermediate section having a tubular body and connecting means for connecting said bus duct unit to other units; and
(d) electrical conductive limiting means at the outer surface of said bus unit limiting the expansion of said members and simultaneously grounding each member of said bus duct unit.

2. A flexible bus duct unit comprising:
(a) a first end section having a tubular body and connecting means at one end thereof for joining said bus duct to other units;
(b) an intermediate section connected to said first end portion comprising a plurality of telescopically connected tubular members each of which has a tail portion with a substantially uniform cross-sectional area, a tapered neck portion adjacent to said tail portion and a bulging front portion adjacent to said neck portion adapted to insert into the tail section of a similar tubular member, said front portion having a smooth curved outer surface along the longitudinal axis of said tubular member providing a maximum outer cross-sectional area perpendicular to the longitudinal axis at approximately the midpoint of said front portion, said maximum outer cross-sectional area being substantially equal and similar to the inner cross-sectional area of said tail portion of a similar unit;
(c) a second end section connected to said intermediate section having a tubular body and connecting means for connecting to other bus duct units; and
(d) at least one electrical conductive cable connected to the outer surface of said bus unit limiting the expansion of said members and simultaneously grounding each member of the bus duct unit.

3. A flexible bus duct unit comprising:
(a) a first end section having a substantially rectangular tubular body and connecting means at one end thereof for joining said bus duct to other units;
(b) an intermediate section connected to said first end portion comprising a plurality of telescopically connected tubular members each of which has a tail portion with a substantially uniform rectangular cross-sectional area, a tapered neck portion adjacent to said tail portion and a bulging front portion with rectangular cross sections adapted to insert into the tail section of a similar tubular member and adjacent to said neck portion, said front portion having a curved outer surface along the longitudinal axis of said tubular member providing a maximum outer rectangular cross-sectional area substantially equal to the inner rectangular cross-sectional area of said tail portion of a similar unit;
(c) a second end section connected to said intermediate section having a rectangular tubular body and connecting means for connecting to other bus duct units;
(d) an electrical conductive cable at the outer surface of said bus unit limiting the expansion of said members and simultaneously grounding each member of said bus duct unit.

4. A flexible bus duct unit comprising:
(a) a first end section having a rectangular tubular body and a flange at one end thereof for joining said bus duct to other units;
(b) an intermediate section connected to said first end portion comprising a plurality of telescopically connected tubular members each of which has a tail portion with a substantially uniform rectangular cross section, a tapered neck portion adjacent to said tail portion, and a bulging front portion with rectangular cross sections adapted to insert into the tail section of a similar tubular member and adjacent to said neck portion, said front portion having a smooth curved outer surface along the longitudinal axis of said tubular member providing a maximum outer cross-sectional area perpendicular to the longitudinal axis at approximately the mid-point of said front portion, said maximum outer cross-sectional area being substantially equal to the inner rectangular cross-sectional area of said tail portion of a similar unit;
(c) a second end section connected to said intermediate section having a rectangular tubular body and flange at its end for connecting said bus duct unit to other units; and
(d) an electrical conductive cable at the outer surface of said bus unit connected to each individual member of the bus duct unit to provide a limiting means for the expansion of said members and simultaneously grounding each member of said bus duct unit.

5. A flexible bus duct unit comprising:
(a) a first end section having a rectangular tubular body and flange portion at one end thereof for joining said bus duct to other units;
(b) an intermediate section connected to said first end portion comprising a plurality of telescopically connected tubular members each of which has a tail portion with a substantially uniform rectangular cross section, a tapered neck portion adjacent to said tail portion, and a bulging front portion with rectangular cross sections adapted to insert into the tail section of a similar tubular member and adjacent to said neck portion, said front portion having a smooth curved outer surface along the longitudinal axis of said tubular member providing a maximum outer cross-sectional area perpendicular to the longitudinal axis at approximately the midpoint of said front portion, said maximum outer cross-sectional area being substantially equal to the inner rectangular cross-sectional area of said tail portion of a similar unit, said front and tail portions being substantially equal in length;
(c) a second end section connected to said intermediate section having a rectangular tubular body and a flange portion at its end for connecting said bus duct unit with other units; and
(d) an electrical conductive cable at the outer surface of said bus unit connected to individual members of said unit limiting the expansion of said members and simultaneously grounding each member of said bus duct unit.

References Cited by the Examiner

UNITED STATES PATENTS

| 1,284,099 | 11/1918 | Harris | 285—166 |
| 2,706,744 | 4/1955 | Rudd | 174—99 |
| 2,874,207 | 2/1959 | Schymik | 174—99 |

FOREIGN PATENTS

| 1,098,836 | 3/1955 | France. |
| 350,359 | 7/1937 | Italy. |

LEWIS H. MYERS, *Primary Examiner.*

J. R. RUGGIERO, *Assistant Examiner.*